H. E. GRABAU.
VEHICLE TIRE.
APPLICATION FILED OCT. 10, 1916.
1,350,995.
Patented Aug. 24, 1920.
4 SHEETS—SHEET 1.
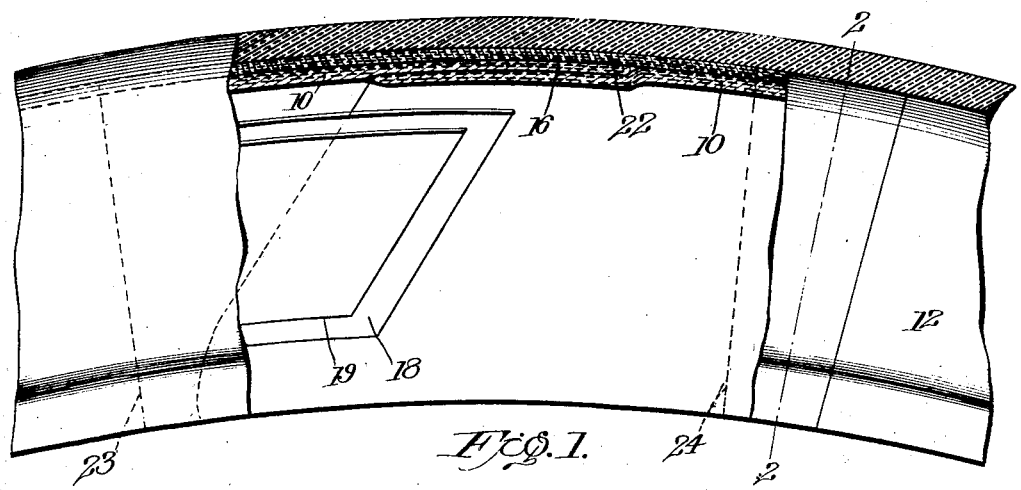
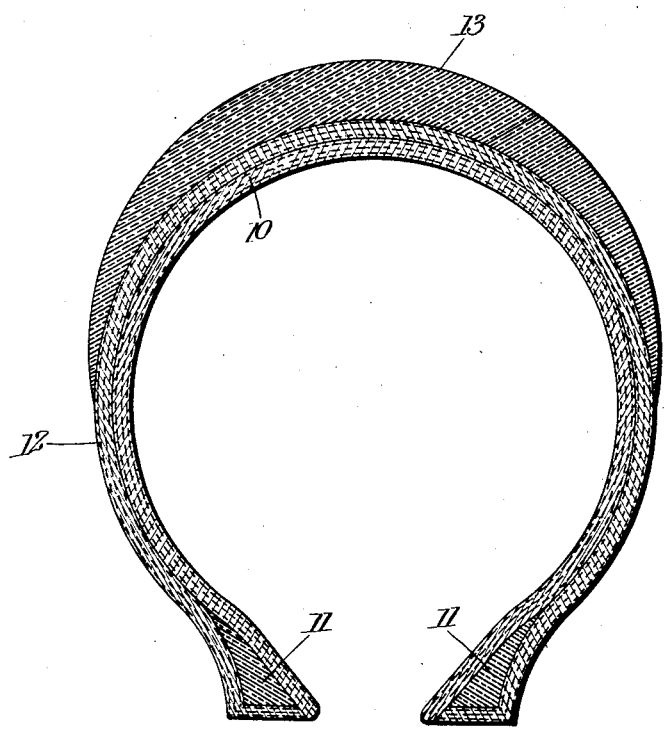

H. E. GRABAU.
VEHICLE TIRE.
APPLICATION FILED OCT. 10, 1916.
1,350,995.
Patented Aug. 24, 1920.
4 SHEETS—SHEET 2.
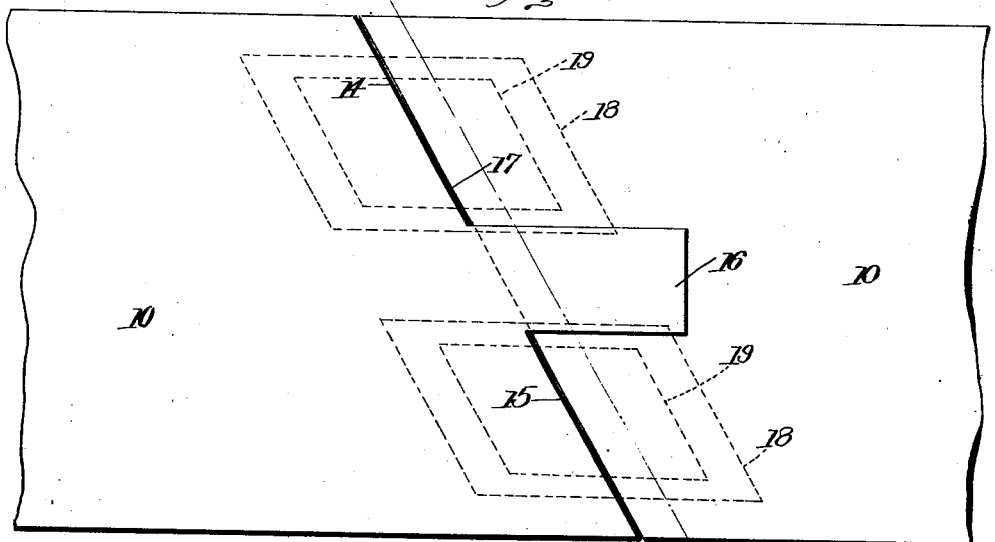
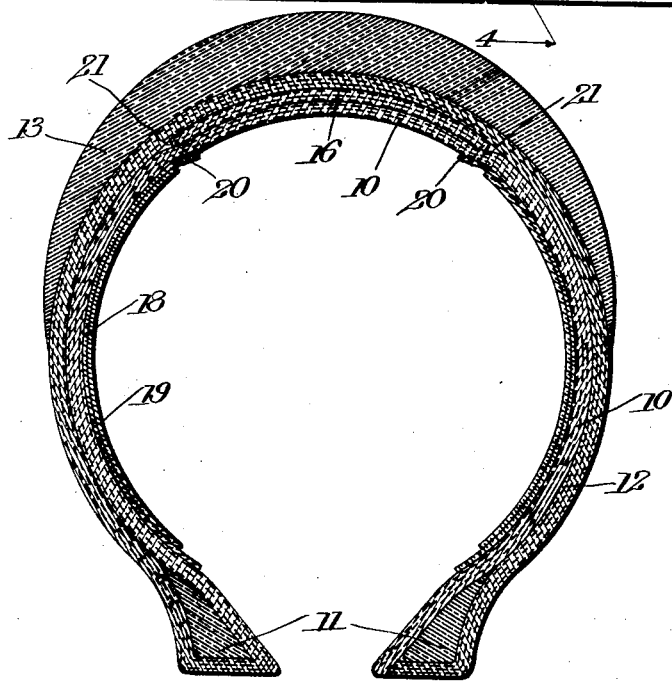

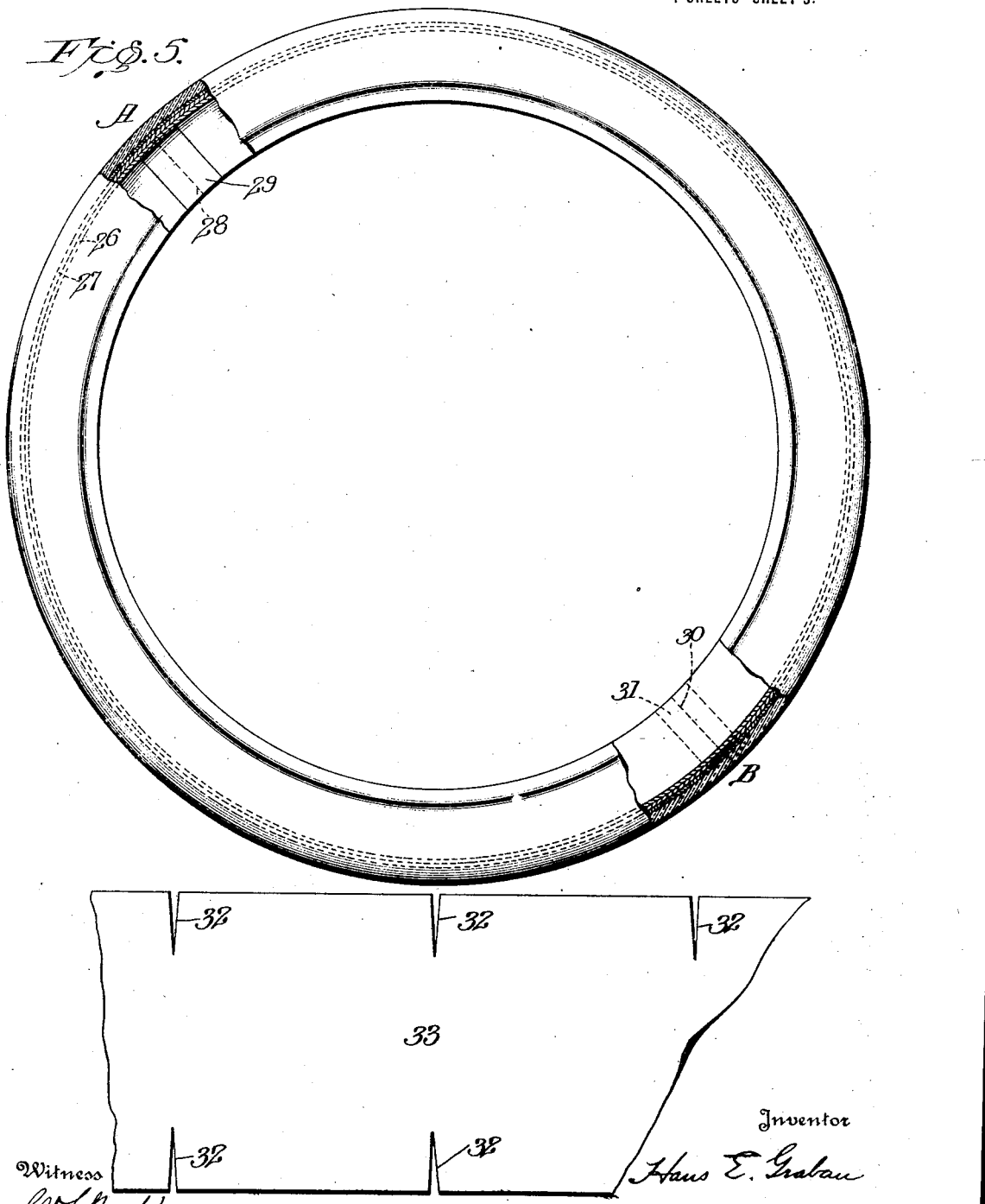

UNITED STATES PATENT OFFICE.

HANS E. GRABAU, OF LONG ISLAND CITY, NEW YORK, ASSIGNOR TO A. CHARLES SCHWARTZ, OF NEW YORK, N. Y.

VEHICLE-TIRE.

1,350,995.  Specification of Letters Patent.  Patented Aug. 24, 1920.

Application filed October 10, 1916. Serial No. 124,889.

*To all whom it may concern:*

Be it known that I, HANS E. GRABAU, a citizen of the United States, and resident of Long Island City, Queens county, State of New York, have invented certain new and useful Improvements in Vehicle-Tires, of which the following is a specification.

The invention relates to cushion tires and more particularly to pneumatic tires. The objects of the invention are to provide a tire which may be manufactured at a fraction of the present cost; to provide such a tire which will be stronger than the types used at present; to provide a tire made from a fabric which is on the market and in commercial use so that no special and new machinery is required to weave the same; to provide an efficient and easily made joint for joining the ends of the strip of fabric extending circumferentially of the tire; to provide means for reinforcing this joint; to provide an arrangement whereby one layer of the structure may consist of a thick strong fabric; and generally to provide an improved tire which will give greater service than present types and yet may be sold for less. Other objects will appear from the description taken in connection with the drawings, in which:

Figure 1 is a view illustrating a portion of the tire, a part being shown in longitudinal section;

Fig. 2 is a transverse sectional view through the tire taken substantially on the line 2—2 of Fig. 1;

Fig. 3 illustrates the joint for connecting the ends of the inner strip of belt fabric, the strip being shown as developed into a plane;

Fig. 4 is a transverse sectional view taken substantially on the line 4—4 of Fig. 3;

Fig. 5 is a side elevation of a tire having two inner strips of belt fabric, portions of the tire adjacent the joints being broken away to illustrate the same;

Fig. 6 is a developed plan view of a single strip which may be used instead of the plurality of transversely extending strips;

Figure 7:
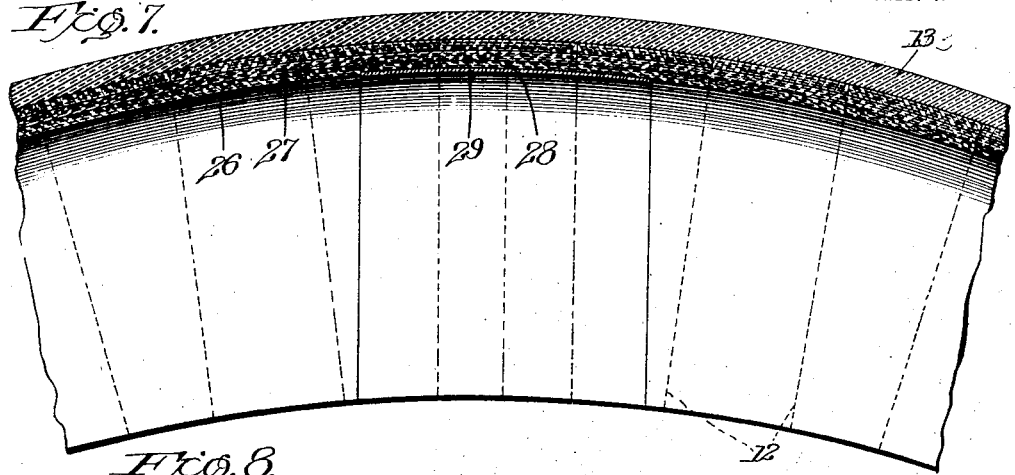
Fig. 7 is a detail in longitudinal section showing the joint at A in Fig. 5.
Figure 8:
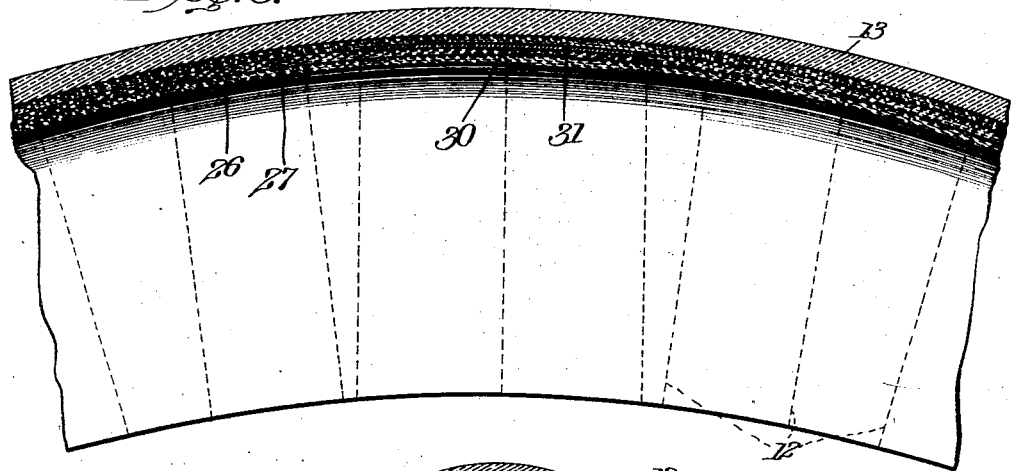
Fig. 8 is a similar view showing the joint at B in Fig. 5.
Figure 9:
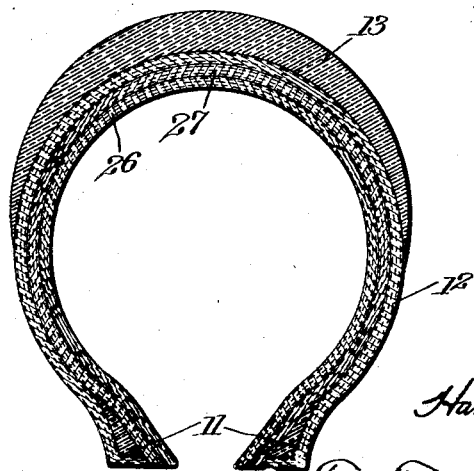
Fig. 9 is a transverse sectional view through the tire illustrated in Fig. 5.

In my Patent No. 1,199,264, granted September 26, 1916, I have disclosed a tire carcass comprising layers of fabric, one layer consisting of strips of fabric extending circumferentially of the tire and another consisting of strips of fabric extending transversely of the tire. This invention consists of a similar arrangement except that the first mentioned layer consists of a single strip of belt fabric. The term belt fabric is intended to refer to the fabrics which are on the market for use as belts. Such fabrics consist of a multiply structure having the plies interwoven. The warp threads extend longitudinally of the fabric and the filling threads are interlaced through the warp threads to interweave the several plies or the warp threads might be interlaced between the filling threads. Furthermore, the filling threads beginning at one side extend to the other and are doubled back through the warp threads; that is the filling threads are endless. Consequently there are no loose thread ends at the sides of the fabric. The width of the belt fabric is made so as to extend from bead to bead of the tire transversely. Obviously, as there are no cut or loose ends at the edges of the fabric, the maximum strength is obtained. It has been proposed to make tires from a single strip of multiply fabric, the fabric being embodied in the tire in such a way that it is necessary to bend the same around the beads. I am not aware that any such tire has actually been made. The fabric is so stiff that it is impossible to bend it in at the beads. Even if this could be accomplished the fabric would straighten out, under service, and a rim blow out would soon follow.

By the arrangement described herein, however, it is possible to use a strip of multiply fabric extending from bead to bead.

Referring to Figs. 1, 2, 3 and 4, it will be noted that the tire consists of a plurality of layers of fabric. The inner layer 10 comprises a single strip of the above described belt fabric arranged circumferentially of the tire. At the longitudinal edges of this strip and exteriorly thereof the beads 11 are arranged. Then transversely extending strips 12 are placed on the exterior of the single strip 10 and around the beads 11. On the exterior of these latter strips the usual rubber thread 13 is vulcanized. The single circumferentially extending strip 10 and the transversely extending strips 12 are prepared with a rubber cement on one side and a thin coating of rubber on the other. In placing the strip 10 on the core the cemented side is on the interior thereof, the rubber side being on the exterior and adapted to have the strips 12 vulcanized thereto. The joint whereby the two ends of the single interior strip are connected is clearly shown in Fig. 3. One end of the strip 10 is cut on the bias at 14 and 15 to form a tongue 16. The other end of the strip is cut on the bias as at 17 from one edge to the other thereof. In assembling this joint, the tongue 16 is overlapped on the other end of the strip and the bias ends 14 and 15 are abutted against the other end 17 of the strip. The abutted portions of the joint are reinforced by two cover strips 18 and 19 which are arranged on the interior side of the strip 10. As clearly shown in Fig. 4, these strips are of a width sufficient to extend substantially from the bead 11 to the edge of the tongue and slightly overlapping the latter. Of course, in the manufacture of the tire after the same has been subjected to pressure, the edges of the strips 18 and 19 will be pressed in so that they are substantially flush with the adjoining surfaces, that is, the interior surface of the tire will be smooth. Of course, the proportions of the tongue 16 and the strips 18 and 19 can be varied to suit the particular conditions of the size of the tire and the processes of manufacture. The cover strip 19 is shorter and narrower than the strip 18 so that the ends of the same form steps thereby permitting the formation of a smooth inner surface for the tire. These strips 18 and 19 consist of the usual single ply fabric used in the manufacture of tires. They consist of a single ply fabric coated with cement on one side and impregnated with rubber on the other. As shown in Fig. 4 the edges 20 of these strips slightly overlap the edges of the tongue 16. This is for the purpose of compensating for the material of the inner fabric 10 which will be pushed into and fill up the openings indicated at 21 when the parts of the tire are placed under pressure. By this means a substantially smooth surface is presented where these edges 20 join the inner strip 10. As stated above the inner strip 10 may be covered with the transversely extending strips 12. These transversely extending strips are strips of belt fabric cut so as to extend from bead to bead of the tire and so their longitudinal edges will abut and form a smooth outer surface. As shown in Fig. 1 a transversely extending strip 22 which is wider than the other strip 12 may be used to cover the joint in the strip 10. For instance, this strip may be of a width extending from the dotted line 23 to the dotted line 24 in Fig. 1. Thus, this wide transversely extending strip acts as an outside cover strip for the joint. Arranged on the outside of the transversely extending strips is the usual rubber tread 13. Of course the different layers of fabric are vulcanized together and the outside rubber tread is vulcanized to the outer layer of fabric.

From an inspection of Figs. 2 and 4 it will be obvious that there are no sharp bends in the inner fabric strip 10. The strips which extend transversely on the outside of the circumferentially extending strip are the ones which have the sharp bends therein and because these bends extend from edge to edge of the strip they may be easily made. It is because the circumferentially extending strip of multiply fabric is arranged on the interior of the tire where it has no sharp bends that it is possible to make a tire embodying such a strip. With the arrangement above described this inner strip takes most of the stress. The transversely extending strips are not depended on for much of the strength of the tire.

Figs. 5, 7, 8 and 9 illustrate a tire of heavier construction in which two interior circumferentially extending strips of belt fabric are used. As shown the tire comprises two such strips 26 and 27. As these strips are arranged on the interior of the tire with the beads or reinforcing rings 11 on the exterior of their longitudinal edges it is apparent that there are no sharp bends in the fabric and that consequently it may be properly shaped. When the two interior strips are used a form of joint different from that previously described may be used if desired. As shown at A in Fig. 5 and to larger scale in Fig. 7, the two ends of the interior strips are butted together at 28 and the joint thus formed is reinforced by an interiorly arranged strip 29 of the ordinary single ply fabric. As shown at B in Fig. 5 and to larger scale in Fig. 8, the joint for the other strip 27 is arranged substantially diametrically opposite the joint A. Similar to the joint 28 the two ends of this strip 27 are abutted as at 30 and a cover strip 31 of the usual single ply fabric is arranged on the exterior of the joint 30, thus reinforcing the same. These two strips 26 and 27 are surrounded by the transversely extending strips of belt fabric 12 which extend around the beads or reinforcing rings 11. To the exterior of these strips 12 the usual rubber tread 13 is vulcanized. As in the form of tire illustrated in Figs. 1, 2, 3 and 4 the strips 26 and 27 of this form have a cement coating on the interior thereof and a rubber coating on the exterior. Thus the different layers may be vulcanized one to another and the rubber tread 13 to the exterior layer.

While I have described two forms of tires which have an outer layer of fabric consisting of transversely extending strips of belt fabric, I may make the same in another form. Instead of the transversely extending strips, a single circumferentially extending strip 33 may be used. However, as this strip must be bent around the beads or reinforcing rings 11 and as the belt fabric is rather stiff and not easily bent it is necessary to cut slits as 32 so that the longitudinal edges of the strip may be bent around the beads. While I have described a tire having the outer layer consisting of either transversely extending strips of belt fabric or a single circumferentially arranged strip it is apparent that this layer might be made in other ways as the main strength of the tire is obtained from the inner layer or layers of the belt fabric.

As this belt fabric is an extremely closely woven and substantially non-stretchable fabric, it is exceedingly stiff and consequently difficult to manipulate to bend to the shape desired in the tire manufacture. If there are any sharp bends formed therein it is apparent that because of the stiffness that they will tend to straighten out when the tire is subjected to stress. For most tires the inner strip may consist of two ply belt fabric, as this gives sufficient strength and yet is not too stiff to be formed into the required shape. By the arrangement of the layers of fabric herein disclosed it is apparent that a tire may be constructed in which the main strength is obtained from a layer or layers of circumferentially extending strips of belt fabric. I believe that I am the first to disclose a practical embodiment of a tire using such strips of belt fabric.

If the joint shown in Figs. 3 and 7 should slightly open in the use of the tire, then the inner cover strip will prevent the inner tube from entering between the ends and being pinched thereby.

Having thus described the invention what is claimed and desired to be secured by Letters Patent is:

1. A vehicle tire including a strip of belt fabric extending circumferentially, means for connecting the ends of said strip, including a tongue on one end overlapped on the other end, from the base of the tongue to the edge of the strip being cut on the bias, and a cover strip connecting the ends of the joint and arranged on the interior of the belt strip on each side of the tongue and of less width than the portion cut on the bias.

2. A vehicle tire including a strip of belt fabric extending circumferentially, and means for connecting the ends of said strip including a tongue on one end overlapped on the other end, from the base of the tongue to the edge of the strip being cut on the bias.

3. A vehicle tire including a strip of belt fabric extending circumferentially, means for connecting the ends of said strip including a tongue on one end overlapped on the other end, from the base of the tongue to the edge of the strip being cut on the bias, and a cover strip connecting the ends of the joint and arranged on the interior of the belt strip.

4. A vehicle tire including a strip of belt fabric extending circumferentially, means for connecting the ends of said strip including a tongue on one end overlapped on the other end, and a cover strip connecting the ends of the joint and arranged on the interior of the belt strip.

5. A vehicle tire including a strip of belt fabric extending circumferentially, means for connecting the ends of said strip including a tongue on one end overlapped on the other end, and a cover strip connecting the ends of the joint and arranged on the interior of the belt strip on each side of the tongue.

6. A vehicle tire including a strip of belt fabric extending circumferentially, means for connecting the ends of said strip including a tongue on one end overlapped on the other end, and a cover strip connecting the ends of the joint.

7. A vehicle tire including a strip of belt fabric extending circumferentially, means for connecting the ends of said strip including a tongue on one end overlapped on the other end, and a cover strip connecting the ends of the joint and arranged on each side of the tongue.

8. A vehicle tire including a single strip of belt fabric extending circumferentially, means for connecting the ends of the strip and having a portion of the ends abutting and another portion overlapping, and cover pieces arranged over the portion of the ends in abutting relation.

9. A vehicle tire including a single strip of belt fabric extending circumferentially, one end being cut to form a tongue, from the base of the tongue to the edge of the strip being cut on the bias, and the other end being cut on the bias parallel to the first end.

10. A vehicle tire comprising layers of fabric, the inner layer consisting of a strip of belt fabric extending circumferentially, beads arranged exteriorly of the said strip at its longitudinal edges, and a layer of fabric vulcanized to the said strip and the exterior of the beads and consisting of strips extending transversely of the tire, one of said latter strips being of sufficient width to cover the joint between the ends of the circumferentially extending strip.

In testimony whereof I affix my signature.

HANS E. GRABAU.